Aug. 4, 1953   I. SORENSEN   2,647,406
LIQUID LEVEL GAUGE
Filed June 20, 1950   2 Sheets-Sheet 1

Imanuel Sorensen
INVENTOR
By Richardson, David and Nordon
his ATTYS.

Aug. 4, 1953     I. SORENSEN     2,647,406
LIQUID LEVEL GAUGE
Filed June 20, 1950     2 Sheets-Sheet 2
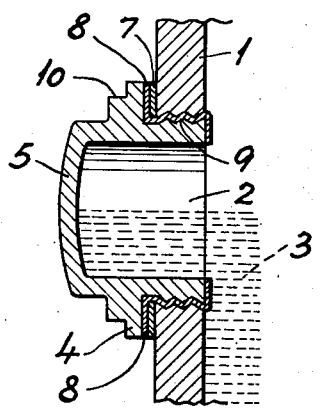
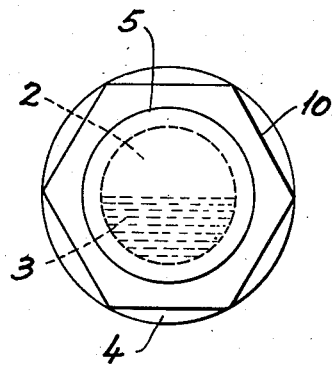
Imanuel Sorensen
INVENTOR
By Richardson, David and Nordon
his ATTYS.

Patented Aug. 4, 1953

2,647,406

UNITED STATES PATENT OFFICE 2,647,406

LIQUID LEVEL GAUGE

Imanuel Sorensen, Copenhagen, Denmark

Application June 20, 1950, Serial No. 169,097
In Denmark June 27, 1949

2 Claims. (Cl. 73—334)

This invention relates to improvements in liquid-level gauges.

The present invention is applicable to such liquid-level gauges of the types which are secured to the wall of a liquid containing receptacle as a closure member for at least one aperture in the wall, being moulded in one piece of a transparent material, having a hollow portion protruding in front of the wall of the receptacle, communicating with the liquid contained within the receptacle, and having a packing flange extending along the wall from the outer circumference of the protruding portion.

If such a liquid-level gauge be newly fitted and clean, the liquid-level can readily be observed, but it has proven in practice that a dark film, originating from impurities and the like, often will appear after the receptacle has been in use for some time and deposits on the inner side of the transparent liquid-level gauge, thereby making a reading of the liquid level effectively impossible, as the luminous flux which is able to penetrate the hitherto known liquid-level gauges of this kind is so small that it will be entirely absorbed by this dark film.

It has been attempted to remedy this disadvantage by providing, in different ways, a separate, loosely fitted and light-reflecting white wall in connection with the liquid-level gauge, but as this white wall will be constantly washed by the liquid, it has been proven that the impurities contained in the liquid will also deposit on this white wall and will obscure it, whereby it will lose its light reflecting power.

Experience also shows that such loose wall may drop into the machine or receptacle, and may thereby cause damage to these latter.

In liquid-level gauges according to the present invention these drawbacks have been overcome. The primary object of the present invention resides in the provision of a light-reflecting and/or phosphorescent layer on the flange located on its surface facing the wall of the receptacle, thereby multiplying the luminous flux which can penetrate the liquid, and which penetration is a condition for making the liquid level distinctly readable. As no liquid will be allowed to reach the layer covered surface and thereby to foul the same, its light-reflecting and light-yielding power will remain at its maximum for an indefinite period. This layer, which may be made reflecting or phosphorescent or both reflecting and phosphorescent, may be molded into the transparent material proper from which the liquid gauge is made and consequently may be totally imbedded in same, so as to exclude any contamination. A sufficiently resistant cover is obtained by coating the inner surface of the packing flange with a thin, white or other light-reflecting, or phosphorescent layer of enamel, or the like, so that it will be the hermetically sealed contact surfaces between the white enamel and the transparent material that become light-yielding, as the whiteness of these surfaces—in other words their light-reflecting power—will remain permanent and unaffected by a possible pollution of the outside of the white enamel layer.

Liquid gauges according to the invention may assume different shapes. They may be made with a circular, rectangular or oblong flange to be secured by means of one or more screws, or they may be made as circular, hollow bodies with external thread to be screwed into a threaded hole. In the latter case, according to the invention, they may be provided with a hexagon head, or the like, for tightening with a spanner.

While the invention is susceptible of various modifications and alternative constructions, I have shown in the drawing and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Figure 1:
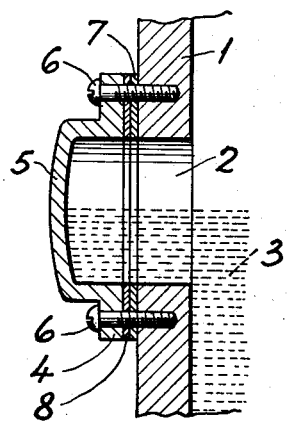
Fig. 1 is a diametrical sectional view of a liquid gauge.
Figure 2:
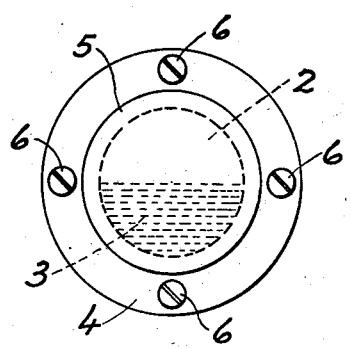
Fig. 2 is a front elevation of Fig. 1.
Figure 3:
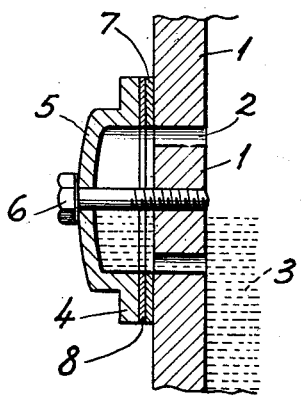
Figure 4:
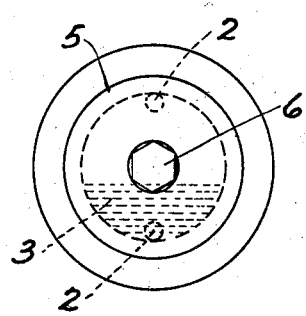

Fig. 3 is a diametrical sectional view of another liquid gauge adapted to be fastened on to the wall of a machine or receptacle, Fig. 4 is a front elevation of Fig. 3, Fig. 5 is a diametrical sectional view of a liquid gauge adapted to be screwed in to the wall of a machine or receptacle, Fig. 6 is a front elevation of Fig. 5, In Figs. 1–4 is shown a circular liquid gauge 5 made from a transparent material and provided with a sealing flange 4. 6 are attachment screws. 2 indicates apertures in a wall 1 of a machine or receptacle containing liquid. 3 represents liquid which half fills the protruding reservoir of the liquid gauge 5, the convexity of said reservoir projecting before the face front line of the flange 4. 7 is a gasket, and 8 is a light-reflecting wall in the shape of a circular slotted disc or a ring molded into the transparent material. The liquid contained in the reservoir will be illuminated from all sides, by direct as well as by reflected light, from wall 8.

Figs. 5–6 show a liquid gauge built on the same principle as a circular, hollow body with external thread 9 for screwing into a threaded hole. 10 is part of the sealing flange 4 which is shaped into a hexagon to facilitate attachment with a spanner. The other letters have similar designations to those shown in Figs. 1–4.

It is within the scope of the invention to provide between the flange of the wholly transparent liquid-level gauge and the wall of the receptacle a layer in form of a gasket, which gasket at least on the surface facing the flange is impregnated with a light-reflecting or phosphorescent substance.

Having thus described my invention what I claim is:

1. Liquid-level gauge for liquid-tight securing to the wall of a liquid containing receptacle as a closure member for at least one aperture in said wall, said gauge being moulded in one piece of a transparent material, having a hollow portion protruding in front of the wall of the receptacle, and having a packing flange extending along said wall from the outer circumference of the protruding portion, said flange on the surface facing the wall being covered with a layer of a substance selected from the group consisting of light-reflecting and phosphorescent materials.

2. Liquid-level gauge for liquid-tight securing to the wall of a liquid containing receptacle as a closure member for at least one aperture in said wall, said gauge being moulded in one piece of a transparent material, having a hollow portion protruding in front of the wall of the receptacle, and having a packing flange extending along said wall from the outer circumference of the protruding portion, said flange on the surface facing the wall being covered with a gasket, which, at least on the surface facing the flange, is covered with a layer selected from the group consisting of light-reflecting and phosphorescent materials.

IMANUEL SORENSEN.

References Cited in the file of this patent

UNITED STATES PATENTS

| Number    | Name   | Date          |
|-----------|--------|---------------|
| 507,857   | Tomey  | Oct. 31, 1873 |
| 1,183,872 | Groff  | May 23, 1916  |
| 2,301,460 | Sauer  | Nov. 10, 1942 |
| 2,345,889 | Talbot | Apr. 4, 1944  |
| 2,374,142 | Steven | Apr. 17, 1945 |

FOREIGN PATENTS

| Number  | Country       | Date          |
|---------|---------------|---------------|
| 275,467 | Germany       | June 18, 1914 |
| 514,133 | Great Britain | Oct. 31, 1939 |